United States Patent
Ke et al.

(10) Patent No.: US 12,358,238 B2
(45) Date of Patent: Jul. 15, 2025

(54) MICROFIBER HIGH-ENERGY IMPLANTATION DEVICE FOR MANUFACTURING THREE-DIMENSIONAL CARBON FIBER REINFORCED COMPOSITES

(71) Applicant: ZHEJIANG UNIVERSITY, Hangzhou (CN)

(72) Inventors: Yinglin Ke, Hangzhou (CN); Jiangxiong Li, Hangzhou (CN); Weidong Zhu, Hangzhou (CN); Qing Wang, Hangzhou (CN); Han Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 350 days.

(21) Appl. No.: 18/020,421

(22) PCT Filed: Nov. 15, 2021

(86) PCT No.: PCT/CN2021/130583
§ 371 (c)(1),
(2) Date: Feb. 8, 2023

(87) PCT Pub. No.: WO2022/100726
PCT Pub. Date: May 19, 2022

(65) Prior Publication Data
US 2023/0302744 A1    Sep. 28, 2023

(30) Foreign Application Priority Data

Nov. 16, 2020 (CN) .......................... 202011280771.2

(51) Int. Cl.
*B29C 70/54* (2006.01)
*B29C 70/14* (2006.01)

(52) U.S. Cl.
CPC .............. *B29C 70/14* (2013.01); *B29C 70/54* (2013.01)

(58) Field of Classification Search
CPC .......................... B29C 65/564; B29C 48/9165
See application file for complete search history.

(56) References Cited

U.S. PATENT DOCUMENTS

| 5,873,973 A * | 2/1999 | Koon | B29C 70/543 |
| | | | 156/272.4 |
| 6,713,151 B1 * | 3/2004 | Dean | B32B 5/16 |
| | | | 361/709 |
| 7,354,626 B1 * | 4/2008 | Patrissi | B05D 1/16 |
| | | | 427/475 |

FOREIGN PATENT DOCUMENTS

| CN | 103764393 | 4/2014 |
| CN | 203957370 | 11/2014 |

(Continued)

*Primary Examiner* — Xiao S Zhao
*Assistant Examiner* — Nicholas J Chidiac
(74) *Attorney, Agent, or Firm* — Jiwen Chen; Joywin IP Law PLLC

(57) ABSTRACT

Disclosed in the present invention is a microfiber high-energy implantation device for manufacturing three-dimensional carbon fiber reinforced composites, wherein the device comprises: a micro fiber feeding module, a micro fiber orientation arrangement module, a micro fiber electrifying module, a micro fiber accelerator injection module, a vacuum generator module, a high-voltage electrostatic acceleration module, an accelerator bunching module, and a micro fiber extraction control module. The present invention uses the large scale micro fibers subjected to charging treatment and reaching scale requirement of the target charge-mass ratio as the fiber source for high-energy implantation, and uses the high-voltage electrostatic acceleration electric field to accelerate and energize the array large-scale micro fibers which are uniformly and directionally arranged, (Continued)

so that the speed and energy thereof can meet the implantation requirement. The output kinetic energy of the micro fibers is used to inject them into the target reinforcement area of the prepreg of the two-dimensional laminate structure to realize the fabrication of three-dimensional carbon fiber reinforced composites.

10 Claims, 4 Drawing Sheets

(56) References Cited

FOREIGN PATENT DOCUMENTS

| | | |
|---|---|---|
| CN | 111284044 | 6/2020 |
| CN | 111410546 | 7/2020 |

\* cited by examiner

MICROFIBER HIGH-ENERGY IMPLANTATION DEVICE FOR MANUFACTURING THREE-DIMENSIONAL CARBON FIBER REINFORCED COMPOSITES

This is a U.S. national stage application of PCT Application No. PCT/CN2021/130583 under 35 U.S.C. 371, filed Nov. 15, 2021 in Chinese, claiming priority of Chinese Application No. 202011280771.2, filed Nov. 16, 2020, all of which are hereby incorporated by reference.

FIELD OF TECHNOLOGY

The present invention relates to the field of implantation device for carbon fiber composites or polymer, and in particular to a microfiber high-energy implantation device for manufacturing three-dimensional carbon fiber reinforced composites.

BACKGROUND TECHNOLOGY

With the development of aerospace technology, carbon fiber-reinforced composite laminates have been widely used because of their advantages. However, due to mechanical joints and other design requirements requiring to drill holes in the laminates, the lamination and stress concentration at the edge of the holes can reduce the overall strength of the structure and become an important cause of failure. It is of great significance to reduce the interface damage caused by hole drilling by enhancing the interlayer performance.

In the prior art, the application documents with public numbers CN 110027304A and CN 111583309A both adopt Z-pin continuous implantation technology. The fiber diameter of traditional Z-pin reinforced technology is generally 0.2 mm~0.6 mm, and the volume fraction ratio is generally 2%~5%. The implantation of Z-pin improves the interlayer performance of the laminates, but the implantation process may cause fiber deflection, fiber curl fracture, the formation of rich fat zone and other problems. The original structures of the laminates are damaged to a certain extent and the in-plane performance of the laminates is decreased. Replacing traditional Z-pin implantation with high-energy micro fiber implantation is expected to solve the above problems. Taking micro carbon fibers as an example, the charge-mass ratio thereof is taken as an evaluation index, and the saturated charge and mass carried by the implanted fibers are calculated as follows:

$$q_{max} = \pi dl\sigma 4\pi\varepsilon_0 = \pi\varepsilon_0\left(1 + 2\frac{\varepsilon-1}{\varepsilon+2}\right)Eld$$

$$m = \frac{1}{4}\pi d^2 l\rho_f$$

wherein, d is the cross section diameter of the fibers, l is the length of the fibers, $\sigma$ is the surface charge density of the fibers, $\varepsilon_0$ is the ambient dielectric constant, $\varepsilon$ is the dielectric constant of the fibers, E is the electric field strength, $q_{max}$ is the amount of saturated charge carried by the fibers, and $\rho_f$ is the density of the micro fibers.

According to electrostatic calculation, the value range of related parameters can be obtained as follows:

$d = 10\times10^{-6} \sim 15\times10^{-6}$ m $l = 0.01 \sim 0.05$ m $\varepsilon = 8$ $\varepsilon_0 = 8.85\times10^{-12}$ Farad/m $E = 1\times10^6 \sim 1\times10^7$ Volt/m $\rho_f = 1\times10^3 \sim 2\times10^3$ kg/m$^3$ It is estimated that the charge-mass ratio of micro fiber implantation can reach the scale of $10^{-2}$ C/kg.

SUMMARY OF THE INVENTION

The object of the present invention is to provide a microfiber high-energy implantation device for manufacturing three-dimensional carbon fiber reinforced composites. The micro fiber monofilament with diameter scale of inn and length of several mms is used as three-dimensional reinforcement material. The charge-mass ratio of the micro fibers meets the requirements of kinetic energy implantation by means of corona charging and other charging methods. A high-voltage electrostatic acceleration electric field is used to accelerate and energize a large-scale array micro fibers with uniform orientation arrangement, so that the speed and energy thereof could meet the requirements of implantation. By using the micro fiber kinetic energy, it is implanted into the prepreg of two-dimensional laminate structure to realize the fabrication of three-dimensional carbon fiber reinforced composites. The three-dimensional reinforced density and mechanical properties of carbon fiber resin-based prepreg are improved.

For the purpose of the present invention, the present invention adopts the following technical solution:

A microfiber high-energy implantation device for manufacturing three-dimensional carbon fiber reinforced composites or fibers, wherein the device comprises:

a micro fiber feeding module, used to provide a fiber source;

a micro fiber orientation arrangement module, used to generate an electrostatic field to realize array dispersion and orientation of micro fibers;

a micro fiber electrifying module, charging large-scale array micro fibers;

a micro fiber accelerator injection module, making the large-scale array charged micro fibers be orderly and effective injected into a next module;

a vacuum generator module, providing a vacuum transmission environment with a low pressure and a low resistance for the micro fibers;

a high-voltage electrostatic acceleration module, internally generating a high-voltage electrostatic field to energize and transmit the large-scale charged micro fibers;

an accelerator bunching module, performing electrostatic force constraint and space motion control on a microfiber flow to form a microfiber high-energy motion envelope flow beam; and a micro fiber extraction control module, used for the high-energy output of the micro fibers and to complete high-energy implantation in a prepreg area.

In the present invention, a core functional unit of micro fiber high-energy implantation device is mainly composed of a micro fiber orientation arrangement module, a micro fiber electrifying module, a micro fiber injection module, a high-voltage electrostatic acceleration electric field module, an accelerator bunching module and a micro fiber extraction control module.

Aiming at the technical requirements of high-energy implantation of micro-scale three-dimensional carbon fiber reinforced composites, the present invention takes the micro fiber orientation arrangement module and the micro fiber electrifying module as a fiber source of the micro fiber high-energy implantation device. According to the requirements of charge-mass ratio of micro fibers of high-energy implantation, the surface pretreatment of micro fibers is carried out by a chemical and physical method, and the array uniform orientation arrangement of micro fibers is realized in a certain way. The surface of the micro fibers is charged through the micro fiber electrifying module for the large scale micro fibers with uniform orientation arrangement, and the charge-mass ratio of the three-dimensional reinforced fiber source of carbon fiber composites can be improved.

In addition, in the present invention, a physical design of high-energy implantation accelerator of micro fibers is composed of the high-voltage electrostatic acceleration electric field module and the accelerator bunching module. The high-voltage electrostatic acceleration electric field is used to energize the micro fibers to accelerate the micro fibers, so as to meet the kinetic energy requirements of the prepreg of two-dimensional laminate structure implanted in the high-energy. The implantation depth of the micro fibers is controlled by smoothing the acceleration voltage of the high-voltage electrostatic acceleration field. Combined with a transverse variable gradient beam electric field of the accelerator bunching module, the stable acceleration and transmission of the micro fibers in the high-voltage electrostatic acceleration electric field are realized.

The following also provides several alternative ways, but not as an additional limit to the overall solution, but only as a further supplement or optimization. Under the premise of no technical or logical contradiction, each alternative way can be combined with the overall solution alone, or a plurality of alternative ways can be combined.

Optionally, an output end of the micro fiber feeding module is provided with a feeding module output valve. The micro fiber feeding module is integrated into an initial end of the device to provide the fiber source for the core functional units of the device on demand.

Optionally, the micro fiber orientation arrangement module comprises an electrostatic shielding box and a fiber orientation electrostatic generator generating the electrostatic field in the electrostatic shielding box. One side of the electrostatic shielding box is provided with an orientation arrangement module butt joint docking with the output valve of the feeding module, and the other side is provided with an orientation fiber conveying gun.

In the present invention, the micro fiber orientation arrangement module is mainly composed of an electrostatic shielding box and a fiber orientation electrostatic generator. Through the electrostatic field generated by the module, the large-scale and scattered micro fiber group can be precharged, and the array dispersion and orientation of micro fibers in the module can be realized by electrostatic induction and electrostatic action of the fibers.

Optionally, the micro fiber electrifying module comprises the following successively arranged components: an orientation fiber receiving valve at the top which is connected with the orientation fiber conveying gun; a fiber charging array plate which is provided with a fiber charging array; a fiber charging fiber-supporting plate arranged in alignment with the fiber charging array; a fiber electrifying high-voltage electrostatic field generator of which the two ends are respectively connected with the fiber charging array plate and the fiber charging fiber-supporting plate; and an electrifying fiber output valve at bottom.

The micro fiber electrifying module is assembled with the orientation fiber conveying gun through the orientation fiber receiving valve at the top to realize the large-scale charging pre-treatment and the docking of the array orientation arrangement fiber module. It is mainly composed of a fiber charging array, a fiber charging array plate, a fiber charging fiber-supporting plate, an electrifying fiber insulation output plate, a fiber electrifying high-voltage electrostatic field generator, a generator mounting plate and a generator stand cover plate. Through an electromechanical control system, the charging function of large-scale array micro fibers can meet the requirement of charge-mass ratio of high-energy implanted fibers.

Optionally, the micro fiber accelerator injection module comprises an accelerator injection cavity and a fiber prebunching cavity which cooperate with each other.

The micro fiber accelerator injection module is installed at a lower end of the electrifying fiber output valve. It is mainly composed of the accelerator injection cavity and the fiber prebunching cavity, which are assembled with each other to provide a pre-injection function for the large-scale array charged micro fibers to enter the high-voltage electrostatic acceleration field orderly and effectively.

Optionally, the vacuum generator module is connected with the fiber prebunching cavity. The vacuum generator module is integrated with the subsequent core functional modules, so as to ensure the acceleration and transmission of large-scale micro fibers under the vacuum environment of low pressure and low resistance.

Optionally, the high-voltage electrostatic acceleration module comprises a high-voltage electrostatic accelerator box, and the high-voltage electrostatic accelerator box is provided with an MV-level high-voltage electrostatic field micro fiber acceleration tube and an MV-level high-voltage electrostatic generator; and the top of the high-voltage electrostatic accelerator box is provided with a high-energy acceleration tube butt joint which is connected with the micro fiber accelerator injection module. The high-voltage electrostatic field is used to energize and transmit the large-scale charged micro fibers, so as to realize the high-energy acquisition of the micro fibers.

Optionally, the accelerator bunching module comprises a high-energy micro fiber flow bunching electrode plate unit integrated around the MV-level high-voltage electrostatic field micro fiber acceleration tube wall tube, and an electromagnetic device located at the end of the MV-level high-voltage electrostatic field micro fiber acceleration tube wall tube.

The accelerator bunching module is mainly composed of a high-energy micro fiber flow bunching electrode plate unit and related electromagnetic components, which are integrated around the MV-level high-voltage electrostatic field micro fiber acceleration tube wall tube. With the transverse variable gradient beam electric field formed by the bunching electrode plate unit, electrostatic force constraint and space motion control are carried out on the high speed moving microfiber flow with same polarity charge and mutual repulsion in the high-voltage electrostatic acceleration electric field. The high-energy moving envelope flow beam of microfibers is formed, which realizes the stable acceleration and transmission of large-scale micro fibers in the high-voltage electrostatic acceleration electric field.

Optionally, the micro fiber extraction control module is installed at the end of the high-voltage electrostatic acceleration module, comprising: a microfiber high-energy output gun; and a charge transfer guide and a gradient pressure stabilizer diaphragm unit located at both ends of the microfiber high-energy output gun.

Optionally, the micro fiber extraction control module is installed at the end of the high-voltage electrostatic acceleration module, and is mainly composed of: a charge transfer guide, a microfiber high-energy output gun, and a gradient pressure stabilizer diaphragm unit. The role of the gradient pressure stabilizer diaphragm unit is to maintain the pressure stability of the module during the high-energy output of the fibers. The end of the microfiber high-energy output gun is a high-energy implantation terminal output disk with an area of several hundred square millimeters. For the large-scale high-energy micro fibers output by the module, the micro-scale three-dimensional high-energy implantation process is realized for a target enhancement area of the prepreg of the two-dimensional laminate structure.

Optionally, the high-energy implanted three-dimensional reinforcing material is large scale microfibers with the monofilament diameter scale of μm and the length of several mms. Through the chemical and physical modification of fiber surface and the charging treatment, the charge-mass ratio and the carrying charge of the micro fibers can reach a target scale required by the high-energy implantation. The length of large-scale microfibers is required to be scale of mm, and the length range of short-fibers which meets the target implantation depth of high-energy implantation of carbon fiber resin-based prepreg can be used. In addition, the functional modules of the device in the present invention meet insulation requirements.

The present invention has the following advantages: 1) The high-energy implantation three-dimensional reinforcing material is large scale microfibers with the monofilament diameter scale of μm and the length of several mms; on the micro-scale, the prepregs with the two-dimensional laminate structure are reinforced in three-dimensions to expand the reinforcement domain and improve the reinforcement density and quality. 2) Being different from the carbon fiber bundle pin needle mechanically implanted by Z-pin used in traditional three-dimensional carbon fiber reinforced composites, the microfiber can reinforce the prepreg of two-dimensional laminate structure through high-energy dynamic implantation, resulting in a wider range of implantation depth, greater reinforcement density, and less matrix damage caused by implantation. 3) The micro fiber orientation arrangement module is used to pretreat the fiber source, and the micro fiber electrifying module is used to make the large-scale micro fibers is carry sufficient charges, improve the feeding efficiency of the reinforcement material, and ensure the energy charging effect in the high-voltage electrostatic module. 4) The micro fiber orientation arrangement module can orient and separate large-scale microfibers through electrostatic induction and electrostatic force, avoid entanglement among fibers, and realize array arrangement of large-scale microfibers. 5) The micro fiber accelerator injection module ensures the charge stability of charged fibers and achieves the smooth entry of large-scale reinforced microfibers into the high-voltage electrostatic acceleration module. 6) The vacuum generator module is integrated with the subsequent core functional module to ensure the acceleration and transmission of large-scale micro fibers under the vacuum environment of low pressure and low resistance. 7) The high-voltage electrostatic acceleration module ensures that the reinforced fibers can obtain the kinetic energy required by the high-energy implantation process, and the intensity of the high-voltage electrostatic field can be adjusted according to the actual implantation depth requirements. 8) Through the transverse variable gradient beam electric field of the accelerator bunching module, large-scale charged microfiber envelope acceleration is formed, and the space motion of high-energy fiber flow in the high-voltage acceleration electric field is controlled to improve the stability of high-voltage electrostatic acceleration. 9) Through the micro fiber extraction control module, high-energy microfibers are output at the output end which is a high-energy implantation terminal output disk with an area of several hundred square millimeters. 10) By the gradient pressure stabilizer diaphragm unit, the pressure of the module can be kept stable during the high-energy fiber output to ensure the vacuum requirement inside the core functional unit of the device. 11) The number of microfibers in a single high-energy implantation can reach a higher scale; and, compared with the traditional Z-pin mechanical implantation, the high-energy implantation has a faster implantation speed, higher stability, higher implantation efficiency and higher degree of automation.

DESCRIPTION OF THE EMBODIMENTS

Many specific details are set forth in the description below to facilitate a full understanding of the present invention. However, the present invention may be implemented in other ways other than those described herein, and therefore the present invention is not limited to the limitations of the specific embodiments disclosed below. The orientation words "up", "down", "left" and "right" mentioned herein are set on the basis of the corresponding accompanying drawings. It can be understood that the appearance of the above orientation words does not limit the protection scope of the present invention.

Embodiments of the present invention are described in detail below, examples of which are shown in the accompanying drawings, wherein same or similar referential numbers throughout indicate the same or similar elements or elements having the same or similar functions. The embodiments described below with reference to the accompanying drawings are illustrative and are intended to explain the present invention and are not to be construed as limitations of the present invention.

In the present invention, unless otherwise expressly specified and limited, the terms "install", "connected", "connecting", "fixed", etc. shall be broadly understood. For example, it can be a fixed connection, a removable connection, or an integrated connection; it can be a mechanical joint, or an electrical connection; it can be directly connected, indirectly connected through an intermediary, or connection between two internal elements. For an ordinary person skilled in the art, the specific meanings of the above terms in the present invention can be understood according to specific circumstances.

Figure 1:
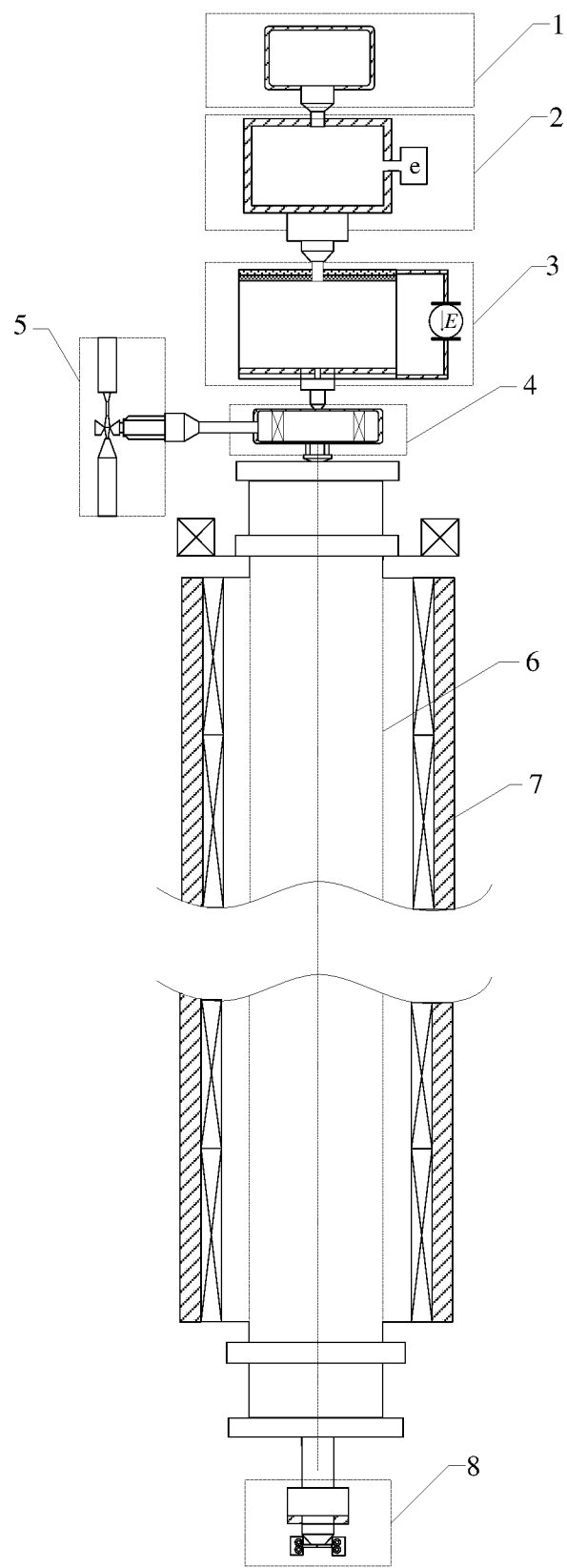
FIG. 1 is a schematic diagram of a core functional unit of micro fiber high-energy implantation device for three-dimensional carbon fiber reinforced composites.

As shown in FIG. 1, there is provided a core functional unit of micro fiber high-energy implantation device for manufacturing three-dimensional carbon fiber reinforced composites, wherein the core functional unit comprises:
- a micro fiber feeding module 1, used to provide a fiber source;
- a micro fiber orientation arrangement module 2, used to generate an electrostatic field to realize array dispersion and orientation of micro fibers;
- a micro fiber electrifying module 3, charging large-scale array micro fibers;
- a micro fiber accelerator injection module 4, making the large-scale array charged micro fibers be orderly and effective injected into a next module;
- vacuum generator module 5, providing a vacuum transmission environment with a low pressure and a low resistance for the micro fibers;
- a high-voltage electrostatic acceleration module 6, internally generating a high-voltage electrostatic field to energize and transmit the large-scale charged micro fibers;
- an accelerator bunching module 7, performing electrostatic force constraint and space motion control on a microfiber flow to form a microfiber high-energy motion envelope flow beam; and
- a micro fiber extraction control module 8, used for the high-energy output of the micro fibers and to complete high-energy implantation in a prepreg area.

Figure 2:
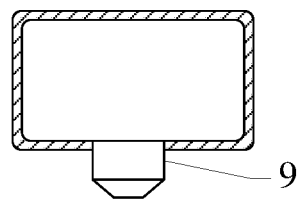
FIG. 2 is a schematic diagram of a micro fiber feeding module.

As shown in FIG. 2, the micro fiber feeding module 1 is integrated into an initial end of the device to provide the fiber source for the core functional units of the device on demand. Its output end is installed with a feeding module output valve 9, so as to transport large-scale micro fibers to the micro fiber orientation arrangement module 2.

Figure 3:
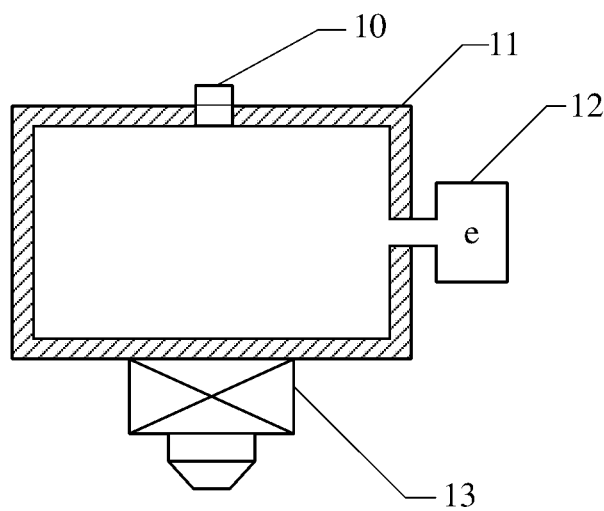
FIG. 3 is a schematic diagram of a micro fiber orientation arrangement module.

As shown in FIG. 3, an electrostatic shielding box 11 and a fiber orientation electrostatic generator 12 together constitute the micro fiber orientation arrangement module 2. An orientation arrangement module butt joint 10 at the top of the electrostatic shielding box 11 is installed on the lower end of the feeding module output valve 9 to receive the micro fibers. Through the electrostatic field generated by the fiber orientation electrostatic generator 12, the large-scale and scattered micro fiber group can be pre-charged, and the array dispersion and orientation of micro fibers in the module can be realized by electrostatic induction and electrostatic action of the fibers. Finally, it is output by an orientation fiber conveying gun 13 at the bottom.

Figure 4:
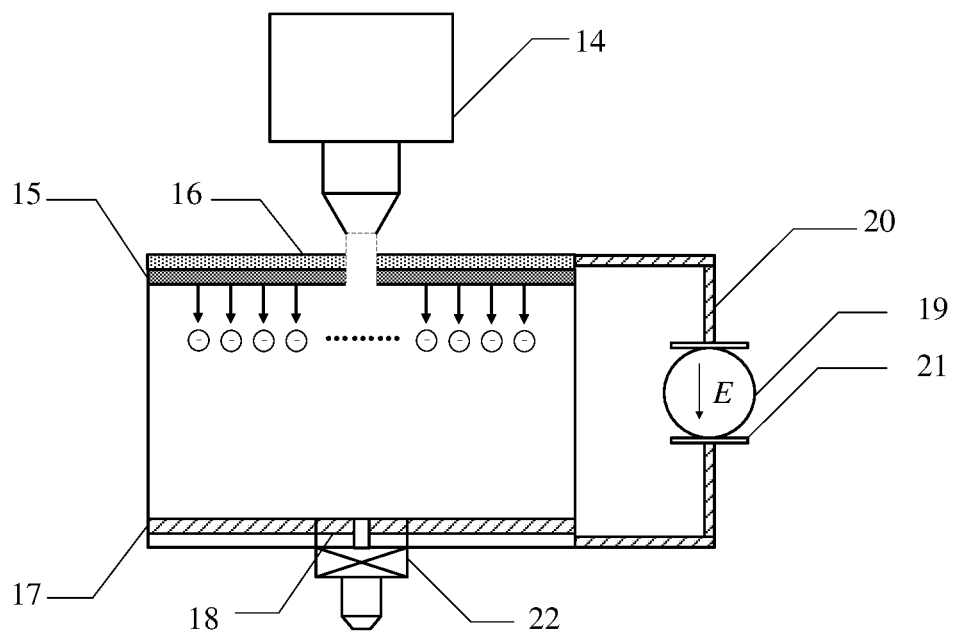
FIG. 4 is a schematic diagram of a micro fiber electrifying module.

As shown in FIG. 4, an orientation fiber receiving valve 14 at the top of the micro fiber electrifying module 3 is assembled with the orientation fiber conveying gun 13 to realize the large-scale charging pre-treatment and the docking of the array orientation arrangement fiber module. The micro fiber electrifying module 3 is composed of a fiber charging array 15, a fiber charging array plate 16, a fiber charging fiber-supporting plate 17, an electrifying fiber insulation output plate 18, a fiber electrifying high-voltage electrostatic field generator 19, a generator mounting plate 20 and a generator stand cover plate 21. The electric field is formed between the fiber charging array plate 16 and the fiber charging fiber-supporting plate 17 by the fiber electrifying high-voltage electrostatic field generator 19, which can make the large-scale micro fibers carry sufficient charge, improve the feeding efficiency of the reinforcement material and ensure the charging effect in the high-voltage electrostatic module.

Figure 5:
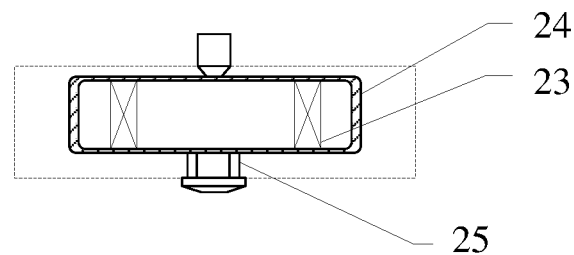
FIG. 5 is a schematic diagram of a micro fiber accelerator injection module.

As shown in FIG. 5, the micro fiber accelerator injection module 4 is installed at a lower end of an electrifying fiber output valve 22. It is mainly composed of an accelerator injection cavity 23 and a fiber prebunching cavity 24, which are assembled with each other to provide a pre-injection function for the large-scale array charged micro fibers to enter the high-voltage electrostatic acceleration field orderly and effectively. The vacuum generator module 5 is integrated with the subsequent core functional module.

Figure 6:
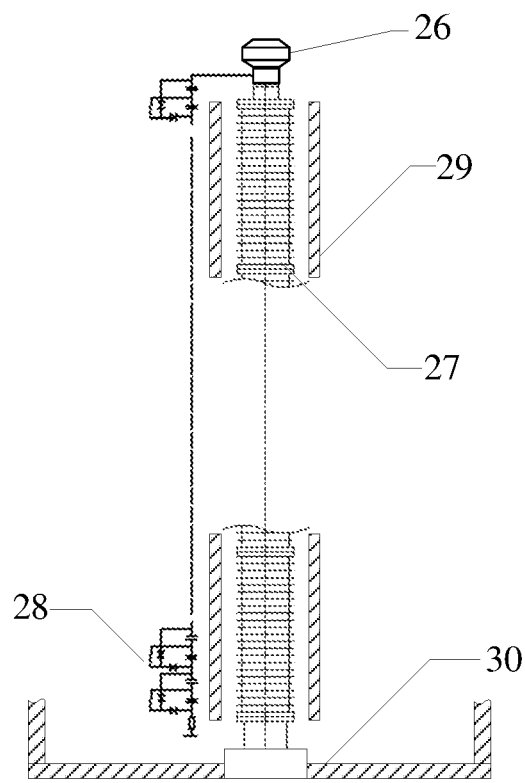
FIG. 6 is a schematic diagram of a high-voltage electrostatic acceleration module.

As shown in FIG. 6, the high-voltage electrostatic acceleration module 6 is mainly composed of an MV-level high-voltage electrostatic field micro fiber acceleration tube 27, an MV-level high-voltage electrostatic generator 28 and a high-voltage electrostatic accelerator box 30. A high-energy acceleration tube butt joint 26 is installed at a lower end of a fiber prebunching cavity output valve 25. The high-voltage electrostatic field is used to energize and transmit the large-scale charged micro fibers, so as to realize the high-energy acquisition of the micro fibers.

Figure 7:
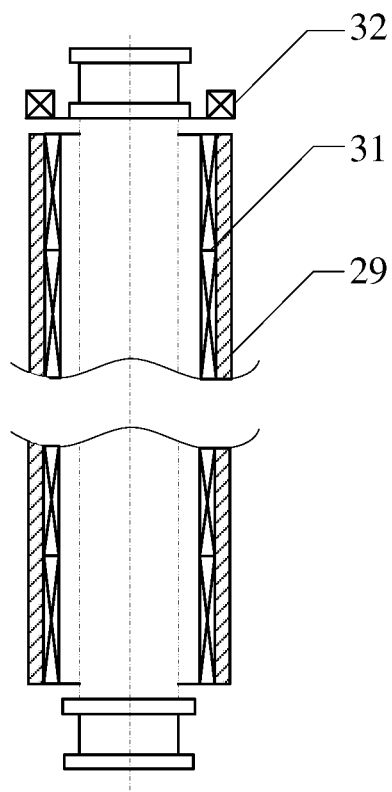
FIG. 7 is a schematic diagram of an accelerator bunching module.

As shown in FIG. 7, the accelerator bunching module 7 is mainly composed of a high-energy micro fiber flow bunching electrode plate unit 31 and related electromagnetic components 32, which are integrated around an MV-level high-voltage electrostatic field micro fiber acceleration tube wall tube 29. With the transverse variable gradient beam electric field formed by the bunching electrode plate unit, electrostatic force constraint and space motion control are carried out on the high speed moving microfiber flow with same polarity charge and mutual repulsion in the high-voltage electrostatic acceleration electric field. The high-energy moving envelope flow beam of microfibers is formed, which realizes the stable acceleration and transmission of large-scale micro fibers in the high-voltage electrostatic acceleration electric field.

Figure 8:
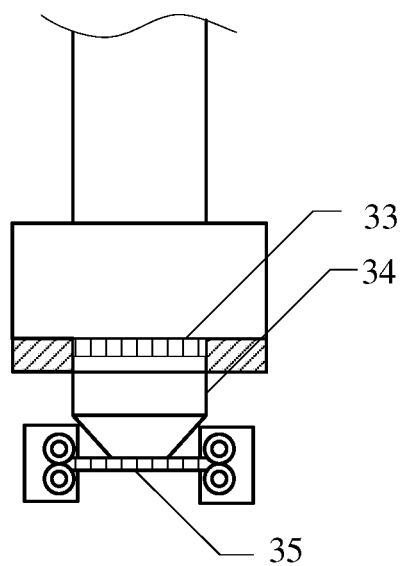
FIG. 8 is a schematic diagram of a micro fiber extraction control module.

As shown in FIG. 8, the micro fiber extraction control module 8 is installed at the end of a high-voltage electrostatic acceleration module 6, and is mainly composed of a charge transfer guide 33, a microfiber high-energy output gun 34, and a gradient pressure stabilizer diaphragm unit 35. The role of the gradient pressure stabilizer diaphragm unit 35 is to maintain the pressure stability of the module during the high-energy output of the fibers. The end of the microfiber high-energy output gun 34 is a high-energy implantation terminal output disk with an area of several hundred square millimeters. For the large-scale high-energy micro fibers output by the module, the micro-scale three-dimensional high-energy implantation process is realized for a target enhancement area of the prepreg of the two-dimensional laminate structure.

In this embodiment, each core functional unit is assembled in turn and finally integrated at the end of an actuator of a six-axis linkage gantry machine tool. The specific working process of the above device is as follows:
1) Through the control of the six-axis linkage gantry machine tool, an end-effector is adjusted to a target position according to the position information of a mold in a machine tool coordinate system, and the high-energy implantation of micro fibers in the square prepreg three-dimensional reinforcement area with an area of several hundred square millimeters is started;
2) The surface of large-scale micro fibers is pretreated by chemical and physical methods, and the fiber charge-mass ratio is improved;

3) The vacuum generator module is started, so as to ensure the acceleration and high-energy output of large-scale micro fibers under the vacuum environment of low pressure and low resistance;
4) The micro fibers are imported into the micro fiber feeding module to complete large-scale micro fiber feeding;
5) The micro fibers enter the orientation arrangement module to realize the array dispersion and orientation of the micro fibers in the module;
6) After orientation arrangement of the micro fibers, the micro fibers enter the micro fiber electrifying module to complete the charging of large-scale array micro fibers that meets the requirements of charge-mass ratio of high-energy implanted fibers;
7) After charging, the micro fibers enter the micro fiber accelerator injection module to realize the smooth entry of large-scale charged micro fibers into the high-voltage electrostatic acceleration electric field;
8) The micro fibers enter the MV-level high-voltage electrostatic accelerator module and do work on the large-scale charged micro fibers through the high-voltage electrostatic acceleration electric field to achieve the high-energy acquisition of fibers;
9) The micro fibers enter the accelerator bunching module to realize the directional high-energy stable acceleration of large-scale micro fibers;
10) The micro fibers enter the extraction control module to realize the high-energy output of the micro fibers, which is used for high-energy implantation of carbon fiber resin-based prepreg;
11) Through the executive control of the micro fiber high-energy implantation extraction control module, the high-energy implantation of the micro fibers in a square prepreg area of hundreds of millimeters is completed;
12) By controlling the gradient pressure stabilizer diaphragm unit, the pressure inside the cavity can be kept stable during the high-energy output of fibers to ensure the vacuum degree requirement inside the core functional module;
13) Through the control of the six-axis linkage gantry machine tool, the end-effector is adjusted to the position and pose of high-energy implantation of the next unit with square three-dimensional reinforcement area of the carbon fiber resin-based prepreg, and the above working process is repeated.

The above contents are only preferred examples of the present invention and are not used to limit the present invention. Any modification, equivalent replacement, improvement, etc. made within the spirit and principle of the present invention shall be included in the protection scope of the present invention.

The invention claimed is:

1. A microfiber high-energy implantation device for manufacturing three-dimensional carbon fiber reinforced composites, wherein the device comprises:
    a micro fiber feeding module (1), used to provide a fiber source;
    a micro fiber orientation arrangement module (2), used to generate an electrostatic field to realize array dispersion and orientation of micro fibers;
    a micro fiber electrifying module (3), charging large-scale array micro fibers;
    a micro fiber accelerator injection module (4), making the large-scale array charged micro fibers be orderly and effective injected into a next module;
    a vacuum generator module (5), providing a vacuum transmission environment with a low pressure and a low resistance for the micro fibers;
    a high-voltage electrostatic acceleration module (6), internally generating a high-voltage electrostatic field to energize and transmit the large-scale charged micro fibers;
    an accelerator bunching module (7), performing electrostatic force constraint and space motion control on a microfiber flow to form a microfiber high-energy motion envelope flow beam; and
    a micro fiber extraction control module (8), used for the high-energy output of the micro fibers and to complete high-energy implantation in a prepreg area.

2. The microfiber high-energy implantation device for manufacturing three-dimensional carbon fiber reinforced composites according to claim 1, wherein the high-energy implanted three-dimensional reinforcing material is large scale microfibers with the monofilament diameter scale of μm and the length of several mms.

3. The microfiber high-energy implantation device for manufacturing three-dimensional carbon fiber reinforced composites according to claim 1, wherein an output end of the micro fiber feeding module (1) is provided with a feeding module output valve (9).

4. The microfiber high-energy implantation device for manufacturing three-dimensional carbon fiber reinforced composites according to claim 2, wherein the micro fiber orientation arrangement module (2) comprises an electrostatic shielding box (11) and a fiber orientation electrostatic generator (12) generating an electrostatic field in the electrostatic shielding box (11); and
    one side of the electrostatic shielding box (11) is provided with an orientation arrangement module butt joint (10) to dock with the feeding module output valve (9), the other side thereof is provided with an orientation fiber conveying gun (13).

5. The microfiber high-energy implantation device for manufacturing three-dimensional carbon fiber reinforced composites according to claim 4, wherein the micro fiber electrifying module (3) comprises the following successively arranged components:
    an orientation fiber receiving valve (14) at the top which is connected with the orientation fiber conveying gun (13);
    a fiber charging array plate (16) which is provided with a fiber charging array (15);
    a fiber charging fiber-supporting plate (17) arranged in alignment with the fiber charging array (15);
    a fiber electrifying high-voltage electrostatic field generator (19) of which the two ends are respectively connected with the fiber charging array plate (16) and the fiber charging fiber-supporting plate (17); and
    an electrifying fiber output valve (22) at bottom.

6. The microfiber high-energy implantation device for manufacturing three-dimensional carbon fiber reinforced composites according to claim 5, wherein the micro fiber accelerator injection module (4) comprises an accelerator injection cavity (23) and a fiber prebunching cavity (24) which cooperate with each other.

7. The microfiber high-energy implantation device for manufacturing three-dimensional carbon fiber reinforced composites according to claim 6, wherein the vacuum generator module (5) is connected with the fiber prebunching cavity (24).

8. The microfiber high-energy implantation device for manufacturing three-dimensional carbon fiber reinforced composites according to claim 1, wherein the high-voltage electrostatic acceleration module (6) comprises a high-voltage electrostatic accelerator box (30), and the high-voltage electrostatic accelerator box (30) is provided with an MV-level high-voltage electrostatic field micro fiber acceleration tube (27) and an MV-level high-voltage electrostatic generator (28);

the top of the high-voltage electrostatic accelerator box (30) is provided with a high-energy acceleration tube butt joint (26) which is connected with the micro fiber accelerator injection module (4).

9. The microfiber high-energy implantation device for manufacturing three-dimensional carbon fiber reinforced composites according to claim 8, wherein the accelerator bunching module (7) comprises a high-energy micro fiber flow bunching electrode plate unit (31) integrated around the MV-level high-voltage electrostatic field micro fiber acceleration tube wall tube (29), and an electromagnetic device (32) located at the end of the MV-level high-voltage electrostatic field micro fiber acceleration tube wall tube (29).

10. The microfiber high-energy implantation device for manufacturing three-dimensional carbon fiber reinforced composites according to claim 4, wherein the micro fiber extraction control module (8) is installed at the end of the high-voltage electrostatic acceleration module (6), comprising:

a microfiber high-energy output gun (34); and a charge transfer guide (33) and a gradient pressure stabilizer diaphragm unit (35) located at both ends of the microfiber high-energy output gun (34).

\* \* \* \* \*